United States Patent
Doepke (10) Patent No.: US 9,662,992 B2
(45) Date of Patent: May 30, 2017

(54) MOTOR VEHICLE HAVING AN INDUCTIVE CHARGING COIL ARRANGED ON A LUBRICANT RESERVOIR OF AN INTERNAL COMBUSTION ENGINE OF THE VEHICLE

(71) Applicant: Bayerische Motoren Werke Aktiengesellschaft, Munich (DE)

(72) Inventor: Hubertus Doepke, Rosenheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 216 days.

(21) Appl. No.: 14/279,812

(22) Filed: May 16, 2014

(65) Prior Publication Data
US 2014/0247009 A1    Sep. 4, 2014

Related U.S. Application Data

(63) Continuation of application No. PCT/EP2012/074494, filed on Dec. 5, 2012.

(30) Foreign Application Priority Data

Dec. 9, 2011   (DE) .................. 10 2011 088 112

(51) Int. Cl.
*H02J 7/00*    (2006.01)
*B60L 11/18*   (2006.01)
(Continued)

(52) U.S. Cl.
CPC ............ *B60L 11/182* (2013.01); *B60K 6/24* (2013.01); *B60K 6/40* (2013.01); *B60L 11/1829* (2013.01);
(Continued)

(58) Field of Classification Search
USPC ........................................... 320/108
See application file for complete search history.

(56) References Cited

U.S. PATENT DOCUMENTS

| | | | |
|---|---|---|---|
| 4,583,034 A * | 4/1986 | Martin | H02J 7/0078 320/134 |
| 4,800,328 A | 1/1989 | Bolger et al. | |
| (Continued) | | | |

FOREIGN PATENT DOCUMENTS

| | | |
|---|---|---|
| DE | 103 60 983 A1 | 7/2004 |
| DE | 10 2009 019 125 A1 | 11/2010 |
| (Continued) | | |

OTHER PUBLICATIONS

International Search Report (PCT/ISA/210) dated Mar. 13, 2013, with English translation (Five (5) pages).
(Continued)

*Primary Examiner* — Yalkew Fantu
(74) *Attorney, Agent, or Firm* — Crowell & Moring LLP (57) ABSTRACT

A motor vehicle includes at least one electric motor for driving the motor vehicle, at least one electrical energy storage device via which the electric motor can be supplied with electrical current, and a charging device having at least one coil via which electrical energy can be inductively transmitted for charging the electrical energy storage device. An internal combustion engine of the motor vehicle includes a reservoir in which lubricant for lubricating the internal combustion engine can be received and on which the coil, and optionally at least one electronics component associated with the coil, is arranged.

18 Claims, 4 Drawing Sheets

(51) Int. Cl.
- *B60K 6/40* (2007.10)
- *F01M 11/00* (2006.01)
- *B60K 6/24* (2007.10)

(52) U.S. Cl.
CPC ...... *F01M 11/0004* (2013.01); *B60L 2230/14* (2013.01); *B60Y 2400/21* (2013.01); *Y02T 10/6269* (2013.01); *Y02T 10/6295* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/14* (2013.01); *Y10S 903/905* (2013.01)

(56) References Cited

U.S. PATENT DOCUMENTS

| | | | | |
|---|---|---|---|---|
| 5,341,083 | A * | 8/1994 | Klontz | B60L 11/1816 320/109 |
| 5,703,461 | A | 12/1997 | Minoshima et al. | |
| 5,969,624 | A * | 10/1999 | Sakai | B60K 6/46 180/65.245 |
| 6,336,063 | B1 * | 1/2002 | Lennevi | B60K 6/28 180/65.1 |
| 6,624,529 | B2 * | 9/2003 | Obayashi | H02J 1/14 290/40 B |
| 7,652,449 | B2 * | 1/2010 | Tae | G01R 31/3662 307/10.7 |
| 2002/0113441 | A1 * | 8/2002 | Obayashi | H02J 1/14 290/40 C |
| 2004/0124722 | A1 | 7/2004 | Uchida et al. | |
| 2008/0084179 | A1 * | 4/2008 | Emori | H02J 7/0016 320/109 |
| 2012/0203410 | A1 | 8/2012 | Wechlin et al. | |

FOREIGN PATENT DOCUMENTS

| | | |
|---|---|---|
| EP | 0 814 557 A1 | 12/1997 |
| EP | 2 345 552 A1 | 7/2011 |
| ES | 2 181 557 A1 | 2/2003 |
| GB | 2468578 A | 9/2010 |
| WO | WO 95/34438 A1 | 12/1995 |
| WO | WO 2011/006884 A2 | 1/2011 |

OTHER PUBLICATIONS

German Search Report dated Nov. 15, 2012, with English language translation (Eleven (11) pages).

* cited by examiner

MOTOR VEHICLE HAVING AN INDUCTIVE CHARGING COIL ARRANGED ON A LUBRICANT RESERVOIR OF AN INTERNAL COMBUSTION ENGINE OF THE VEHICLE

CROSS REFERENCE TO RELATED APPLICATIONS

This application is a continuation of PCT International Application No. PCT/EP2012/074494, filed Dec. 5, 2012, which claims priority under 35 U.S.C. §119 from German Patent Application No. 10 2011 088 112.3, filed Dec. 9, 2011, the entire disclosures of which are herein expressly incorporated by reference.

BACKGROUND AND SUMMARY OF THE INVENTION

The invention relates to a motor vehicle, in particular a hybrid vehicle.

Hybrid vehicles are known in the prior art. Such a hybrid vehicle includes an internal combustion engine and at least one electric motor. Both the internal combustion engine and the electric motor are used to drive the hybrid vehicle. In other words, driven wheels of the hybrid vehicle can be driven by way of the electric motor and by way of the internal combustion engine.

The hybrid vehicle further includes at least one electrical energy storage device, in particular a battery, via which the electric motor is supplied with electrical current.

It is known that the internal combustion engine can act as what is known as a range extender. If the electrically stored energy of the electrical energy storage device is depleted, the electrical energy storage device can be recharged by way of the internal combustion engine combusting fuel, without making it necessary to charge the electrical energy storage device via an external power supply network.

Moreover, so-called plug-in hybrid vehicles are known. In such a plug-in hybrid vehicle, the electrical energy storage device is charged by connecting the electrical energy storage device to an external power supply network. The connection between the electrical energy storage device and the external power supply network is established by way of a power cable, for example.

However, so-called inductive charging is also known as a way to implement convenient charging of the electrical energy storage device. U.S. Pat. No. 5,703,461 discloses an electric vehicle, the battery of which can be charged via a secondary coil of the electric vehicle.

In addition to the convenience aspect of the electric vehicle being always recharged automatically after shutting it off, such as at home, and the driver almost always returning to a full storage system at the start of a trip, the system-inherent higher availability of the electric vehicle on the power supply network during inductive charging is advantageous. This is advantageous in terms of the load/utilization of the power supply network, but also contributes to relieving the electrical energy storage device, since the same is charged more frequently using small charge intervals.

The secondary coil can cooperate with a primary coil. The primary coil is connected to an energy source. Electrical energy can be inductively transmitted via the primary coil and the secondary coil, thereby charging the battery.

However, the installation space requirement of the coil in the vehicle (secondary coil) is quite significant. In conjunction with the requirements that must be met to ensure safe charging of the electrical energy storage device, positioning the coil in the vehicle may pose a problem and result in packaging problems, in particular with respect to the ground clearance of the vehicle.

Thus, it is the object of the present invention to provide a motor vehicle having at least one electric motor for driving the motor vehicle, the coil being favorably positioned in the vehicle in terms of the installation space.

This and other objects are achieved by a motor vehicle including at least one electric motor for driving the motor vehicle, at least one electrical energy storage device via which the electric motor can be supplied with electrical current, and a charging device having at least one coil via which electrical energy can be inductively transmitted for charging the electrical energy storage device. An internal combustion engine is provided in the vehicle. The engine includes a reservoir in which lubricant for lubricating the internal combustion engine can be received and on which the coil is arranged.

Such a motor vehicle comprises at least one electric motor for driving the motor vehicle. At least one wheel of the motor vehicle can be driven via the electric motor. The motor vehicle also has at least one electrical energy storage device, via which the electric motor can be supplied with electrical current. Moreover, a charging device having at least one coil in the vehicle is provided. Electrical energy can be inductively transmitted via the coil so as to charge the electrical energy storage device.

The coil is a secondary coil, for example, which can cooperate with a primary coil inductively, and thus in a non-contact manner. The primary coil is connected to an energy source, for example, in particular a power supply network, so that electrical energy can be transmitted to the coil in the vehicle via a magnetic field that is delimited between the primary coil and the secondary coil. The electrical energy storage device can thus be charged inductively using electrical energy.

According to the invention, at least one internal combustion engine is provided, which includes a reservoir that can receive lubricant for lubricating the internal combustion engine. The coil in the vehicle (secondary coil) is disposed on the reservoir for this purpose. In that regard, the term "on" is used very generally and includes without limitation the coil being on an inner or outer surface of the reservoir, as well as being in or within the reservoir, or integrated into the reservoir.

By positioning or mounting the coil on the reservoir, synergies are utilized between the requirements in particular in regard to the positioning of the reservoir and the requirements in particular in regard to the positioning of the coil in the vehicle. The coil is thus positioned in an advantageous location in the motor vehicle, so that it can cooperate very well with the primary coil. In addition, the coil is particularly favorably positioned in terms of the installation space, so that packaging problems can be solved and/or avoided. The coil may be situated outside the reservoir or be integrated into the reservoir.

The reservoir is preferably a so-called oil pan of the internal combustion engine, in which the lubricant, in particular oil, can be received and collected. After the internal combustion engine has been lubricated, the lubricant collects in the reservoir (oil pan), from where it can be discharged to again lubricate the internal combustion engine. The reservoir is situated at a low, and in particular at the lowest, point of the internal combustion engine in the vertical vehicle direction, so that the lubricant can easily collect in the reservoir under the action of gravity. Since the coil is integrated into the reservoir, the coil is thus also situated at a very low point of the motor vehicle in the vertical vehicle direction, so that the coil can advantageously and efficiently cooperate with the primary coil.

Another advantage is that no undesirable distance must be provided between the internal combustion engine and the coil in the vehicle to allow movements of the internal combustion engine relative to the coil, without any contact occurring between the internal combustion engine and the coil as a result of the relative movements. In the motor vehicle according to the invention, the coil can move together with the internal combustion engine during operation of the same. Since the distance between the coil and the reservoir or the internal combustion engine is avoided, sufficient ground clearance of the motor vehicle can be ensured.

In one advantageous embodiment of the invention, the reservoir includes at least one receiving chamber for receiving the lubricant, wherein the coil is accommodated in the receiving chamber. In this way, installation space that is available anyhow can be utilized to position the coil favorably in terms of the installation and, advantageously, for the cooperation with the primary coil.

Advantageously, at least one electronics component that is associated with the coil is also situated on the reservoir. The electronics component is preferably situated on the receiving chamber. The available installation space can thus be used particularly efficiently.

Positioning the coil, and optionally the at least one electronics component, in the receiving chamber represents a modular system concept, which allows effects and modifications on the vehicle to be avoided, or minimized, by accommodating the coil in the receiving space. In other words, the coil can be situated in a modular fashion in the receiving chamber in a time- and cost-effective manner when the inductive charging device is installed in the motor vehicle. By simply replacing the reservoir, the internal combustion engine can be used both with the motor vehicle according to the invention comprising the inductive charging device and with motor vehicles without the inductive charging devices. This keeps costs low due to economies of scale.

The positive modular system effect is essentially that modification costs of the coil are limited to the development of the reservoir in the case of plug-in hybrid vehicles. Since plug-in hybrid vehicles are, at least predominantly, derived from conventional vehicle concepts, in which only internal combustion engines are used, it is advantageous to avoid or minimize modification allowances and/or measures for a corresponding connection of the coil. This keeps the costs low, in particular, and results in a favorable connection of the coil, and optionally of the electronics component associated therewith, in terms of the installation space.

For example, the at least one electronic component may be at least one rectifier and/or at least one capacitor, in particular a capacitor packet. The electronics component or electronics components and the coil are associated with a resonant circuit so as to implement the inductive charging.

The electronics component or electronics components can be situated together with the coil in a shared housing in close proximity to the coil. As an alternative, it may be provided that the coil and the at least one electronics component are each arranged in dedicated, separate housings, which are separated from each other, and are electrically connected to each other. Flexibly and appropriately positioning them on or in the reservoir is advantageous for this purpose. It may be provided that the coil is located in the housing thereof in the receiving chamber, while the at least one electronics component is located at another location of the motor vehicle.

In one further advantageous embodiment of the invention, a bottom of the reservoir, which downwardly delimits the receiving chamber in the vertical vehicle direction, and/or the entire reservoir may be made of a non-magnetic material, in particular of a plastic material. This allows trouble-free, safe and efficient charging of the storage device as a result of the advantageous energy transmission between the primary coil and the coil in the vehicle (secondary coil), without metallic components of the reservoir being able to impair the magnetic field between the coil and the primary coil.

The motor vehicle according to the invention is designed as a hybrid vehicle, for example, wherein the motor vehicle can be driven both by way of the electric motor and, at least in an auxiliary manner, by way of the internal combustion engine. The internal combustion engine can also serve only as a range extender, so that the hybrid vehicle can be driven solely by way of the electric motor. The range extender is used to charge the electrical energy storage device by combusting fuel when the electrical energy storage device has been drained. For this purpose, the internal combustion engine can be operated at least substantially in a steady-state mode and at an operating point that is favorable in terms of fuel consumption. The motor vehicle according to the invention can thus be driven in a way that is low in emissions and, in particular, at only a low fuel consumption, which thus lowers $CO_2$ emissions.

In particular, the motor vehicle can be a plug-in hybrid vehicle, in which the electrical energy storage device can be charged via the coil in a way that is simple and convenient for the driver.

Further synergistic effects as a result of positioning the coil, and optionally the at least one electronics component, on the reservoir, and in particular as a result of integrating these into the reservoir, are also attained in that the reservoir and the coil, and optionally the at least one electronics component, are preferably to be located, or are located, in so-called cold areas of the motor vehicle. Internal and external cooling conditions are favorable in the area of the reservoir, and thus of the coil, and temperature effects from exhaust tract components of the internal combustion engine are avoided or are at least very low. The coil, and optionally the at least one electronics component, can thus be cooled, or maintained at a relatively cool temperature, while the electrical energy storage device is being charged, which allows an efficient charging process.

It is possible to cool the coil and optionally the at least one electronics component, one of which or both of which can heat up as the electrical energy storage device is being charged, by way of a lubricant. In this way, both the capacity of the lubricant and a surface of the reservoir can be used to cool the coil. Additional cooling devices can thus be eliminated.

It is furthermore possible to utilize the heating of the coil during the charging operation to heat the lubricant. In this way, heat can be transferred from the coil to the lubricant. It is thus possible to heat the internal combustion engine prior to the same being started, so that it can be operated with low friction, and thus fuel-efficiently, already while it is started or particularly soon after being started.

The lubricant that has been heated by way of the coil can be delivered by way of a pump device, in particular an electric pump, and can thus be circulated in the internal combustion engine so as to heat the same by further heat transfers from the lubricant to the colder internal combustion engine.

The charging cycle for charging the electrical energy storage device is advantageously carried out immediately prior to the start of a trip, so that the internal combustion engine is already heated at the start of the trip. The driver can preferably program his desired start of the trip so as to automatically begin the charging cycle accordingly prior to the start of the trip, and end the same immediately prior to the start of the trip. This allows a temperature-adjusted passenger compartment to be provided for the driver already at the start of the trip.

In one further advantageous embodiment, the coil is located in the area of an axle, in particular a front axle, comprising steerable wheels of the motor vehicle. The coil in the vehicle can thus be positioned particularly easily and quickly relative to the primary coil, and in particular with at least regional overlap with the same. Steering movements by the driver of the motor vehicle thus at least substantially directly affect the position of the coil in the vehicle relative to the primary coil. This results in a convenient charging process.

In one further embodiment of the invention, the coil is located, at least regionally, in a space of a front axle support of the motor vehicle, for example, which is delimited, at least regionally, by at least two support elements of the motor vehicle, in particular of the front axle support. The support elements can thus protect the coil if the motor vehicle is subjected to impact in the event of an accident and can thus minimize the damage. Moreover, installation space that is available anyhow can be utilized this way. The coil is thus positioned particularly favorably in terms of the installation space.

The coil preferably has an outer contour that, at least substantially, corresponds to an inner contour of the space which is formed by the support elements. The space can thus be used efficiently for arranging the coil. In particular, a large surface of the coil which is effective during charging can thus be implemented so as to be able to transfer high amounts of energy. This results in a fast charging process.

So as to efficiently utilize the space, the outer contour of the coil can be designed to differ from an at least substantially circular cross-section. For example, the coil can be designed to be angular, trapezoidal or the like. As a result of this design of the coil, in particular with respect to the actively effective surface thereof or transmission surface during the charging process, the coil is adapted to installation space circumstances and installation conditions, so that packaging problems can be avoided and/or solved.

In the vertical vehicle direction, the coil is advantageously located without any overlap with magnetic components toward the bottom. In other words, the coil is not covered toward the bottom by magnetic components in the vertical vehicle direction. In this way, an efficient charging process and energy transmission between the coil and the primary coil are possible. Exhaust pipes, lines and/or other components of the motor vehicle, which could adversely affect the magnetic field between the coil and the primary coil, are preferably located laterally in the transverse vehicle direction and/or above the coil in the vertical vehicle direction.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
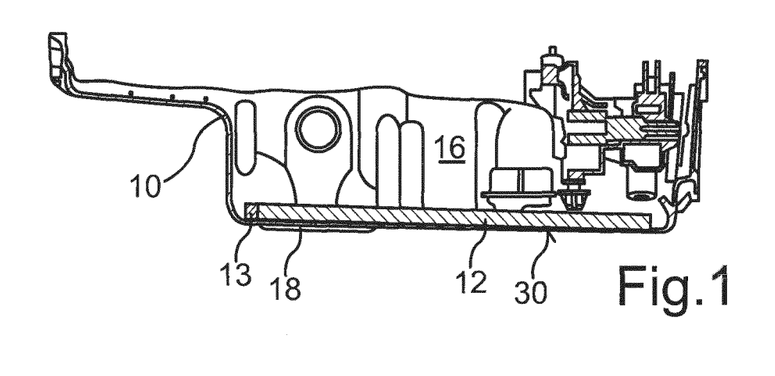
FIG. 1 is a schematic longitudinal section view of an oil pan of an internal combustion engine of a motor vehicle, which vehicle also includes at least one electric motor, wherein a secondary coil, via which an electrical energy storage device that is used to supply the electric motor with electrical current can be charged, is integrated into the oil pan.
Figure 2:
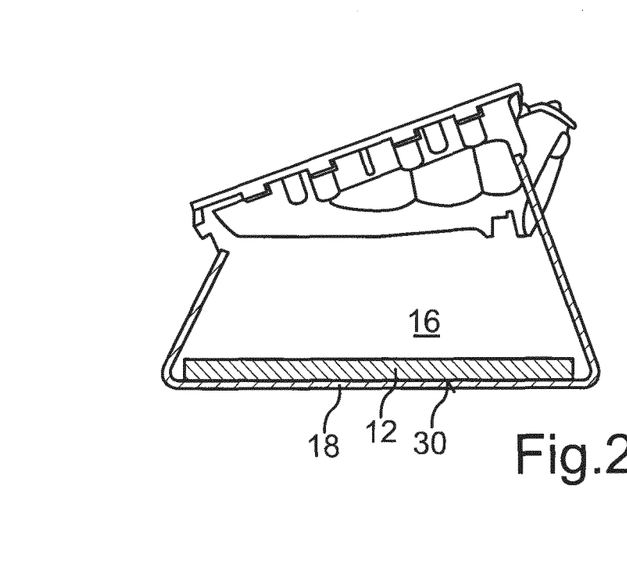
FIG. 2 is a schematic front view of the oil pan including the secondary coil according to FIG. 1.
Figure 3:
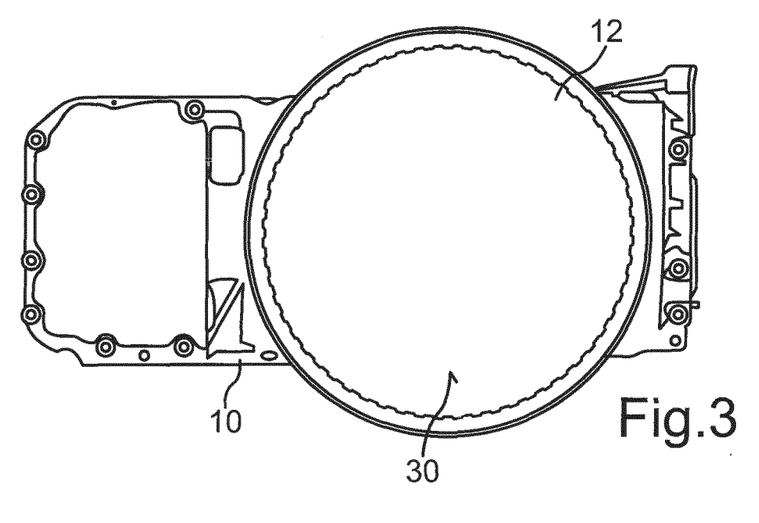
FIG. 3 is a schematic bottom view of the oil pan including the secondary coil according to FIGS. 1 and 2.

FIGS. 1 to 3 show an oil pan 10 for an internal combustion engine of a hybrid vehicle, which is designed as a reciprocating internal combustion engine, for example. The hybrid vehicle further includes at least one electric motor, by way of which the hybrid vehicle can be driven At least one electrical energy storage device, in particular a battery, is associated with the electric motor. The electric motor can be supplied with electrical current via the battery, so that the electric motor can drive at least one wheel of the hybrid vehicle.

The internal combustion engine is used to drive the motor vehicle and/or to charge the electrical energy storage device when the battery is depleted of the electrical current it has stored. When the battery is being charged, the internal combustion engine can be operated, at least substantially, in a steady-state mode and at an operating point that has low fuel consumption, so that the battery can be charged using only very little fuel.

Moreover, the hybrid vehicle includes a charging device, by way of which the battery can be inductively charged. For this purpose, the charging device includes a secondary coil 12 in the vehicle, via which electrical energy can be inductively transmitted for charging the battery. The charging device further includes electronics components 13 associated with the secondary coil 12. For example, the electronics components 13 are a capacitor, or a capacitor packet, and a rectifier. The capacitor, or the capacitor packet, and the secondary coil 12 are associated with a resonant circuit, which is connected downstream of the rectifier.

Figure 4:
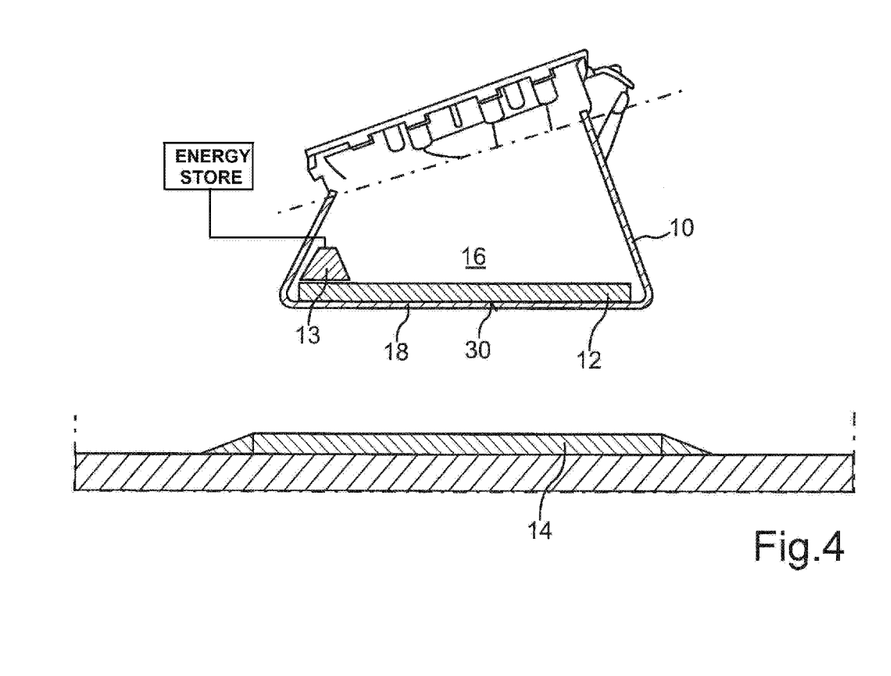
FIG. 4 is a further schematic side view of the oil pan according to FIG. 2, which is arranged above a primary coil, with which the secondary coil cooperates so as to charge the electrical energy storage device which is also schematically illustrated.

In order to charge the battery, the secondary coil 12 is positioned so as to overlap, at least regionally, with a primary coil 14 (FIG. 4) in the vertical vehicle direction, so that the secondary coil 12 in the vehicle can cooperate with the primary coil 14 below it. The primary coil 14 is connected to an energy source, such as a power supply network, so that electrical energy can be transmitted from the primary coil 14 via a narrowly delimited magnetic field to the secondary coil 12, thereby charging the battery.

As can be seen in particular in FIGS. 1 and 2, the secondary coil 12 and the electronics component 13 are integrated into the oil pan 10. The oil pan 10 has a receiving chamber 16, in which lubricating oil of the internal combustion engine is collected and received. The lubricating oil is used to lubricate components of the internal combustion engine that move relative to each other. After the components of the internal combustion engine have been lubricated, the lubricating oil collects in the oil pan 10, in particular under the action of gravity. For this purpose, the oil pan 10 is situated at a particularly low point of the internal combustion engine in the vertical vehicle direction. Positioning oil pan 10 in this way is also particularly favorable for the secondary coil 12 since the same, as a result of being integrated into the oil pan 10, is also situated at a particularly low point, and thus in proximity to the ground. The secondary coil 12 can thus efficiently cooperate with the primary coil 14.

A further advantage is that advantageous ambient conditions, in particular with regard to the application of temperatures to the oil pan 10, can also be utilized for the secondary coil 12 and the electronics components 13. The oil pan 10 is not subjected to heat, or only to a very small degree, from components of the hybrid vehicle, and in particular of the exhaust tract of the internal combustion engine, and can be cooled at least partially by the airstream while the hybrid vehicle is moving, so as to ensure an at least substantially constant operating temperature for the internal combustion engine. These advantageous temperature conditions also benefit the secondary coil 12 and the electronics components 13. At the same time, advantageous ground clearance of the hybrid vehicle can be achieved as a result of the integration of the secondary coil 12 and the electronics components 13 into the oil pan 10. Moreover, the secondary coil 12 and the electronics components 13 can be cooled by way of the oil in the oil pan 10 during charging. The waste heat absorbed by the oil can be used prior to the start of a trip by targeted and controlled charging so as to preheat the cooled-down internal combustion engine. It is thus possible to keep heating phases of the internal combustion engine to a minimum or to avoid them.

In the present example, the secondary coil 12 and the electronics components 13 are accommodated in the receiving chamber 16. Space, or installation space, that is available anyhow can thus be utilized to favorably position the secondary coil 12 and the electronics components 13 in terms of the installation space and avoid modifications to the vehicle as well as packaging problems.

Moreover, no magnetic or metallic components are situated in the vertical vehicle direction beneath the oil pan 10, and thus also beneath the secondary coil 12, so that the transmission of energy between the secondary coil 12 and the primary coil 14 is not adversely affected.

A bottom 18 of the oil pan 10, which downwardly delimits the receiving chamber 16 in the vertical vehicle direction, is preferably made of a non-magnetic material, in particular of a plastic material. Efficient and safe energy transmission between the secondary coil 12 and the primary coil 14 can thus be ensured.

Figure 5:
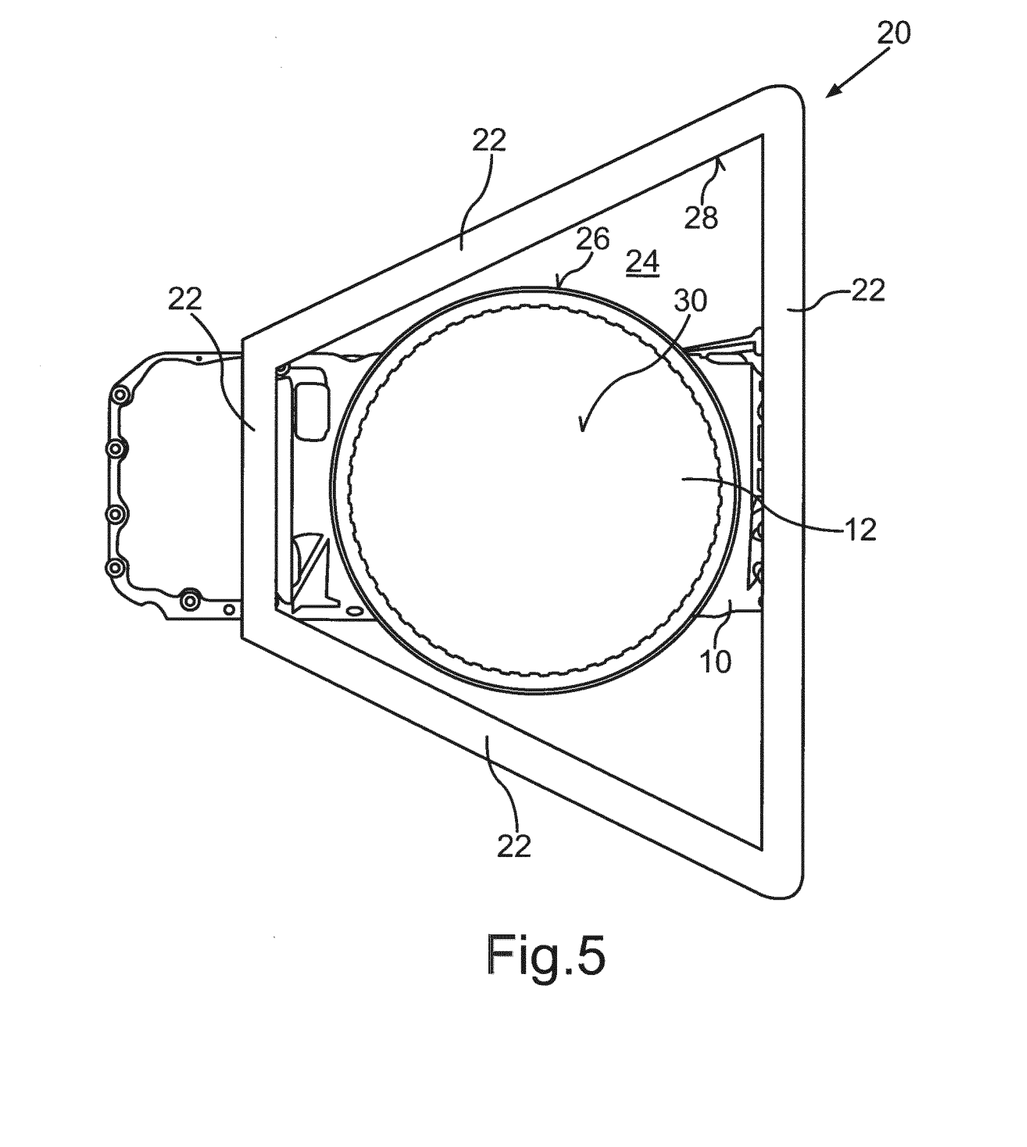
FIG. 5 is a further schematic bottom view of the oil pan according to FIG. 3, which is located in a space delimited by a front axle support of the motor vehicle.

FIG. 5 shows a front axle support 20 of the hybrid vehicle. For example, steerable front wheels of the hybrid vehicle are articulated to the front axle support 20. As an alternative or in addition, the front axle support 20 can be used to mount the internal combustion engine and/or the electric motor. The front axle support 20 includes ties 22, which are connected to each other and which delimit a space 24 between the ties.

As can be seen from FIG. 5, the secondary coil 12, together with the oil pan 10, is now accommodated at least partially in the space 24. The ties 22 of the front axle support 20 can thus protect the secondary coil 12 and the oil pan 10 from undesirable damage if these are subjected to impact in the event of an accident. Moreover, installation space that is available anyhow is utilized by situating the secondary coil 12 in the space 24, so that favorable positioning of the secondary coil 12 in terms of the installation space is implemented.

A further advantage of situating the secondary coil 12 and the electronics components 13 in the area of the front axle is that the secondary coil 12 can be positioned easily and quickly relative to the primary coil 14. Steering movements by the driver of the hybrid vehicle at least substantially directly affect the positioning of the secondary coil 12 relative to the primary coil 14. Time-consuming steering maneuvers for advantageously positioning the secondary coil 12 relative to the primary coil 14 can thus be avoided. This benefits a convenient and efficient preparation of the charging process.

Figure 6:
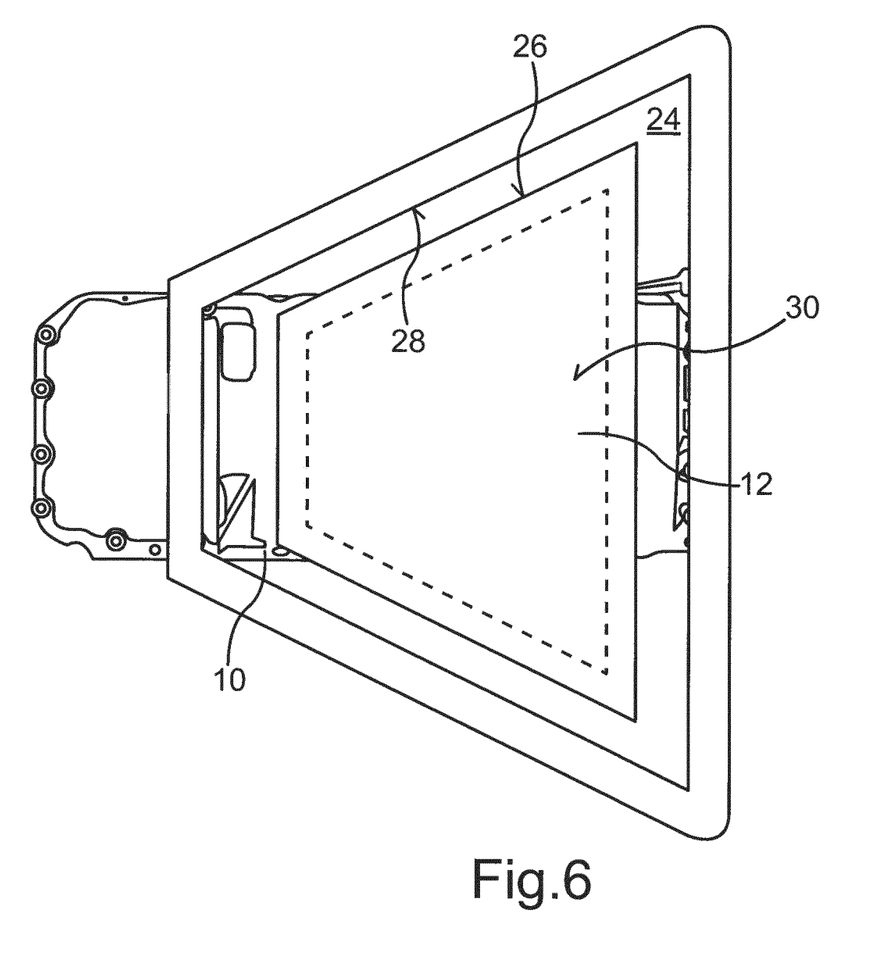
FIG. 6 is a schematic bottom view of a further embodiment of the oil pan including the coil according to FIG. 5.

As can be seen based on FIG. 6, the outer contour 26 of the secondary coil 12 can be designed to differ from a round cross-section. According to FIG. 6, the outer contour 26 of the secondary coil 12 at least substantially conforms to the inner contour 28 of the space 24. This allows efficient use of the space 24. In particular, a particularly large transmission surface 30, which is actively effective during the charging process, for the magnetic field between the secondary coil 12 and the primary coil 14 is implemented, whereby a particularly fast charging process of the battery is possible. The outer contour 26 of the secondary coil 12 can have an at least substantially trapezoidal, rectangular or otherwise design.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   an electric motor for driving the motor vehicle;
   an electrical energy storage device via which the electric motor is suppliable with electrical current;
   an internal combustion engine comprising a reservoir for storing lubricant used to lubricate the internal combustion engine; and
   a charging device comprising a coil via which electrical energy is inductively transmitted for charging the electrical energy storage device, the coil being arranged on the reservoir of the internal combustion engine.

2. The motor vehicle according to claim 1, wherein
   the reservoir comprises a receiving chamber in which the lubricant is held, and
   the coil is accommodated inside the receiving chamber.

3. The motor vehicle according to claim 2, further comprising:
   an electronics component associated with the coil, the electronics component being arranged inside the receiving chamber.

4. The motor vehicle according to claim 1, further comprising:
   an electronics component associated with the coil, the electronics component being located on the reservoir.

5. The motor vehicle according to claim 3, wherein
   a bottom of the reservoir that downwardly delimits the receiving chamber in a vertical vehicle direction is formed of a non-magnetic material.

6. The motor vehicle according to claim 5, wherein the non-magnetic material is a plastic material.

7. The motor vehicle according to claim 2, wherein
a bottom of the reservoir that downwardly delimits the receiving chamber in a vertical vehicle direction is formed of a non-magnetic material.

8. The motor vehicle according to claim 7, wherein the non-magnetic material is a plastic material.

9. The motor vehicle according to claim 1, wherein the coil is located in an axle area of the motor vehicle.

10. The motor vehicle according to claim 9, wherein the axle area is a front axle area for steerable wheels of the motor vehicle.

11. The motor vehicle according to claim 1, wherein the coil is located, at least regionally, in a space delimited, at least regionally, by at least two support elements of the motor vehicle.

12. The motor vehicle according to claim 11, wherein the coil has an outer contour configured to correspond to an inner contour of the space delimited by the at least two support elements of the motor vehicle.

13. The motor vehicle according to claim 1, wherein the reservoir is an oil pan for the internal combustion engine.

14. A lubricant reservoir for an internal combustion engine of a motor vehicle equipped with an electric motor for driving the motor vehicle, an electrical energy storage device for supplying electrical energy to the electric motor, and a charging device via which the electrical energy storage device is charged with electrical energy, the reservoir comprising:
a housing in which lubricant for the internal combustion engine is received; and
a coil of the charging device being located on the housing, the coil facilitating inductive charging of the electrical energy storage device.

15. The reservoir according to claim 14, wherein the housing includes a bottom formed of a non-magnetic material.

16. The reservoir according to claim 14, wherein the coil is arranged inside the housing.

17. The reservoir according to claim 14, further comprising:
an electronics component coupled with the coil, the electronics component being located on the housing.

18. The reservoir according to claim 14, wherein the reservoir is an oil pan of the internal combustion engine.

\* \* \* \* \*